United States Patent [19]
Catherall

[11] 4,031,370
[45] June 21, 1977

[54] GENERATION OF MATHEMATICAL FUNCTIONS

[75] Inventor: Reginald Catherall, Woking, England

[73] Assignee: Bell & Howell Limited, Basingstoke, United Kingdom

[22] Filed: Feb. 17, 1976

[21] Appl. No.: 658,349

[30] Foreign Application Priority Data

Feb. 26, 1975 United Kingdom ............... 8134/75

[52] U.S. Cl. ............................. 235/152; 235/197
[51] Int. Cl.² ...................... G06F 7/38; G06F 1/02
[58] Field of Search ......................... 235/152, 197

[56] References Cited
UNITED STATES PATENTS

| | | |
|---|---|---|
| 3,789,203 | 1/1974 | Catherall et al. .................. 235/152 |
| 3,967,100 | 6/1976 | Shimomura ........................ 235/152 |

Primary Examiner—Jerry Smith
Attorney, Agent, or Firm—Richard L. Myers

[57] ABSTRACT

A method of interpolating a value of the dependent variable, $y$ corresponding to a given value of an independent variable $x$, wherein $y = f(x)$ and is described by a linear polynomial series of the 8'th order. The method uses a 4'th order polynomial interpolation method to obtain up to an 8'th order interpolation in 2 iterations of the 4'th order method. The method is suitable for implementation by a computer or by purpose-designed data processing apparatus. An embodiment of apparatus suitable for use in performing the method is also disclosed.

29 Claims, 11 Drawing Figures

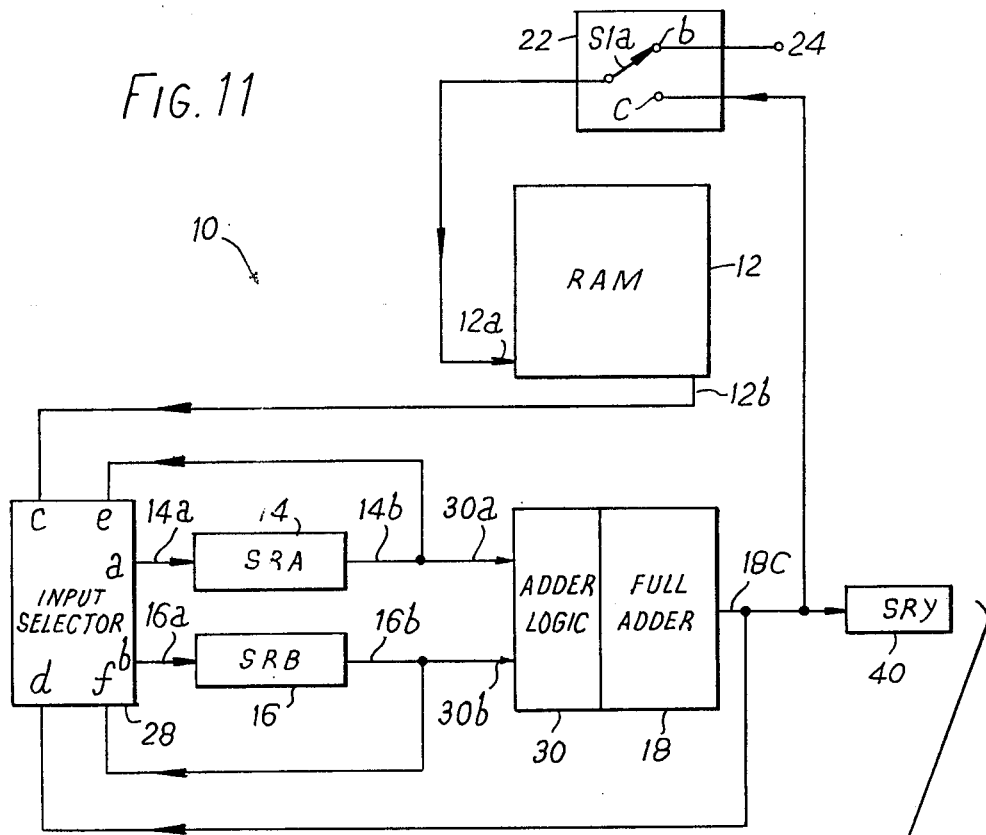
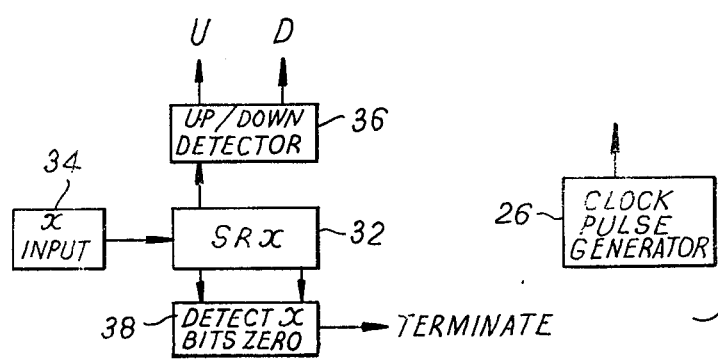
FIG. 11

GENERATION OF MATHEMATICAL FUNCTIONS

BACKGROUND OF THE INVENTION

This invention relates to the generation of values of mathematical functions using iterative interpolation methods.

DISCUSSION OF THE PRIOR ART

Many data processing situations arise in which it is required to have available the value of a function $y = f(x)$ at any value of $x$ within a given range. One way of meeting the requirement in data processing systems is to store in a memory values of the dependent variable $y$ for given values of the independent variable, $x$ and then to interrogate the memory to obtain the value of $y$ for a given value of $x$. A disadvantage of such an arrangement is that it is possible to store only discrete values of $x$ and if it is necessary to store a large number of such values the cost of the memory can be high.

In the specification of our co-pending British Pat. application No. 8045/75 of even date there is disclosed, inter alia, a method of interpolating a value of the dependent variable $y$ for a given value of the independent variable, $x$ of the function $y = f(x)$, and apparatus for performing the method. The function $y = f(x)$ is a linear polynominal in $x$. The method involves an iterative interpolation technique which can be regarded as interpolation by repeated bisection of a segment of the operative range of the independent variable $x$ whereby an initial segment joining two point values of the function at the extremities of the range are bisected to form two new segments. One of the two new segments includes the given value of $x$ for which the value of the dependent variable, $y$ is required, and this is the new segment of interest. The new segment of interest can then be bisected in the same way, and so on such that the length of each segment is progressively halved and converges on the given value of $x$. In one aspect the method comprises the steps of linearly interpolating between the two point values which define a segment of interest to obtain a mid-point value and correcting the mid-point value by the addition of a correcting value or "residual need." The corrected mid-point value is then substituted for one of the two previous point values to define a new segment of interest and the step of interpolating and correcting the new mid-point value with a new correcting value is re-iterated until the value of $y$ is obtained for the given value of $x$. The correcting values may be derived from the second order term of a polynomial series or a combination of the second order term with a progressively higher order term or terms of the series. The series used in the method is called a binary polynomial series.

Another method of and apparatus for interpolating the value of the dependent variable, $y$ for a given value $x$ of a function $y = f(x)$ is disclosed in the specification of an earlier British Pat. No. 1,363,073 (U.S. Pat. No. 3,789,203) which describes the binary polynomials in some detail.

The methods disclosed in the aformentioned specifications are suitable for implementation on a suitably programmed aforementioned or by means of other apparatus (hardware) designed for the purpose.

The binary polynomial interpolation method has the property that it can provide interpolated values of $y$ at the end points of the initial segment of interest and at a binary sequence of $x$ values. The length of the sequence for which exact values of $y$ are obtained is dependent upon the order of the polynomial interpolated, for example for a fourth order polynomial method interpolated over a normalised $x$ range of values from 0 to 1 the value of $y$ so obtained will be an exact fit at $x$ values of 0, ¼, ½, ¾, and 1. Similarly for an eighth order polynomial method the interpolated value of $y$ will be an exact fit at $x$ values of 0, ⅛, ¼, ⅜, ½, ⅝, ¾, ⅞, and 1. Generally in the aforementioned methods it is found that the number of points of exact fit in the sequence is one more than the order of the polynomial interpolated. It will be understood that, in general, the accuracy of interpolation can be increased by increasing the order of the polynomial, but this is accompanied by a concommitant increase in complexity of such implementation.

When polynomial approximation is needed for a plurality of functions, it may be found that a given polynomial order will meet most of the requirements, but a small number of the functions will require a higher order approximation.

One way of dealing with this would be to implement the interpolation at the highest order necessary to meet the requirement of the most difficult function but the added complexity and cost may not be justified. Another way would be to use a technique known as "piecewise approximation" in which the range is subdivided into a number of zones but this approach results in a significant increase of stored data when precision interpolation is required for a difficult function.

It is an object of the invention to provide a method of interpolating a value of a dependent variable, $y$ which is a function of an independent variable, $x$ in which hardware or software organised to provide $n$th order interpolation can be used to provide up to a $2n$th order interpolation by double operation.

SUMMARY OF THE INVENTION

According to the invention there is provided a method of interpolating a value of the dependent variable $y$ corresponding to a given value of an independent variable $x$, wherein $y$ is a function of $x$ and is described by a linear polynomial series of the $2n$th order and the terms of the series containing the $(n+1)$th to the $2n$th polynomials are in the form of an expression which is a product of a common $n$th order polynomial of $x$, and the sum of the $n$th to the zero'th order polynomials respectively, each multiplied by its appropriate coefficient, using an $n$th order polynomial interpolation method to obtain up to a $2n$th order approximation in 2 iterations of the $n$th order interpolation method, comprising the steps of determining the coefficients and using them to perform an $n$th order interpolation to obtain a specific coefficient for the common $n$th order polynomial at the given value of the independent variable $x$, modifying, as required the coefficients relevant to the $n$th and lower order polynomials to consolidate the term which comprises the common $n$th order polynomial multiplied by its specific coefficient and performing a second $n$th order interpolation using the modified coefficients at the given value of the independent variable $x$ whereby the result of the second interpolation is the value of the dependent variable, $y$ for the given value of the independent variable which would have been obtained by using a higher order interpolation method up to the $2n$th order, The method according to the invention may be implemented by programming a computer automatically to calculate the value of the required variable, or by means of data-processing apparatus designed for the purpose.

The invention also comprises a computer or data-processing apparatus when conditioned to carry-out the method.

The invention further comprises a method according to the invention in the form of a program stored in physical form such as on a programmed Read Only Memory.

DESCRIPTION OF THE DRAWINGS

The invention will now be described by way of example with reference to the accompanying drawings, in which:

FIG. 11 is a simplified block circuit diagram of an apparatus for implementing a method according to the invention disclosed in our aforementioned patent application No. 8045/75.

The derivation of the binary polynomials and methods of and apparatus for implementing the polynomials are developed in some detail in the aforementioned patent specifications. However a brief explanation of them may be useful for a better understanding of the method of the present invention.

When a polynomial approximation is used to interpolate values of $y$ as a function of $x$ it is common practice first to normalise the problem to a convenient $x$ range, such as −1 to +1 or 0 to 1. In the following explanation it will be assumed that the $x$ range is normalised to 0 to 1 and that the algorithms will be performed using a 2's complement binary code but it is emphasised that this is not a limitation of the method.

As aforementioned the iterative interpolation method using a binary polynomial series arrives at the required $x$ value for which the value of $y$ is to be obtained by repeated bisection of the $x$ range, that is $y$ is interpolated in a series of stages which establish a binary series of $x$ values such that:

at the first stage ($n=1$) $y$ is obtained at $x/2$ at the second stage ($n=2$) $y$ is obtained at the odd quarter value of $x$ in the segment containing the required $x$ value.

at the third stage ($n=3$) $y$ is obtained at the odd eighth value of $x$ in the segment containing the required $x$ value.

Also as aforementioned the binary polynomial iterative interpolation method has the property that it provides interpolated values of $y$ for a binary sequence of $x$ values.

A fourth order binary polynomial series of the form:

$$y = d_0 B_0 + d_1 B_1 + d_2 B_2 + d_3 B_3 + d_4 B_4$$

where $d_n$ is the $n$th order coefficient and $B_n$ is a linear polynomial of $x$ of the $n$th order will now be derived by way of example, using a well known function $y = \sin x$ over a range 0° to 90° normalised to an $x$ range 0 to 1. Its extension to an eighth order polynomial series will then be stated in order to describe a specific method according to the invention.

Figure 9:
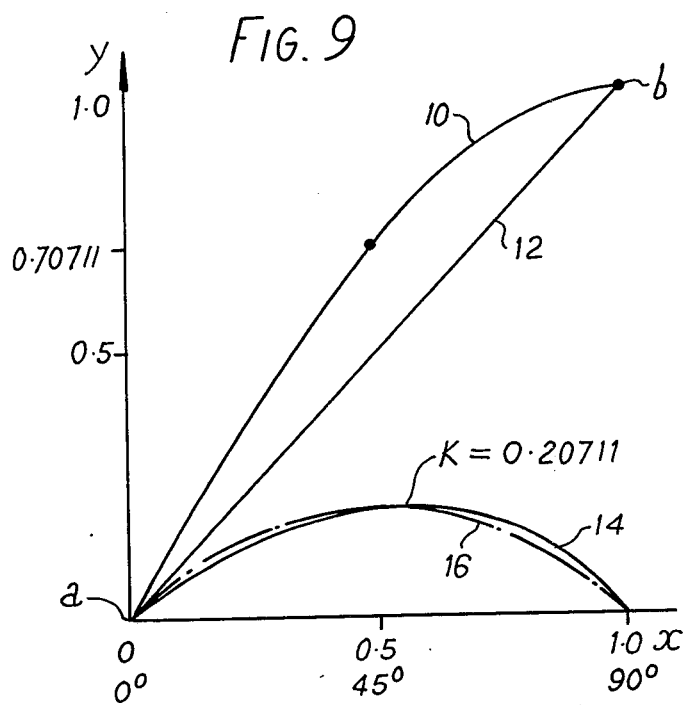
FIG. 9 shows graphs of $y = \sin x$ and $y = x$ over an $x$ range 0° to 90° normalised to a range 0 to 1, a plot of the differences between the values $y = \sin x$ and $y = x$ and a graph of a parabola of the form shown in FIG. 3 multiplied by a coefficient whereby its magnitude is equal to that of the differences curve at $x = \frac{1}{2}$.

Referring to FIG. 9, there is shown a curve 10 of the function $y = \sin x$ over an $x$ range 0° to 90° normalised to an $x$ range 0 to 1, and in the usual way the value of $y$ at any given value $x$ in the range will be depicted as $y_{(n)} = \sin x_{(n)}$ i.e. $y_{(0)} = \sin 0 = 0$; $y_{(1/2)} = \sin_{(1/2)} = \sin 45 = 0.70711..$ etc.

Two specific end point values, $a$, $b$, have been designated on the curve. Point $a$ is the value of $y_{(0)}$ at the origin, that is the value of the $x$ intercept and the point $b$ is the value of $y_{(1)}$. The equation of a line drawn between points $a$ and $b$ may be expressed in the form $y = \frac{1}{2}(a+b) + \frac{1}{2}(b-a)\cdot 2(x-\frac{1}{2}) = a + (b-a)x$. A solution of this expression will only supply values $y = x$, i.e., a straight line 12. Linear interpolation between these two point values would give a value of $y$ at $x = \frac{1}{2}$ of $$y_{(1/2)} = (a+b)/2$$

For a second interpolation two options are available and that is to step UP or DOWN, i.e. to interpolate $$y_{(1/4)} \text{ or } y_{(3/4)}$$

that is $y_{(1/4)} = [a + y_{(1/2)}]/$ or $y_{(3/4)} = [y_{(1/2)} + b]/2$, and the decision to interpolate $y_{(1/4)}$ or $y_{(3/4)}$ would be determined by the given $x$ value for which the value of $y$ is required.

It will be obvious that linear interpolation between two end points will provide answers in agreement with the polynomial expression $y = mx + b$ (the equation for a straight line) but would be quite inadequate in the case of a nonlinear function such as $y = \sin x$.

In FIG. 9, a curve 14 is a plot of the differences between the curves 10 and 12 and may be regarded as a residual need curve; that is, at any given value of $y = f(x)$ it is the value (or residual need) which has to be added to the value obtained by linear interpolation of $y = f(x)$ between two point values which bracket the given value of $x$. It will be seen that it approximates to a parabola which is a second order polynomial of the form $B_1 = K4x(1-x)$ where K is a coefficient and the second order polynomial $x(1-x)$ is multiplied by a scaling factor 4 which gives a value of unity for the expression when $x = \frac{1}{2}$.

Thus, a term describing a parabola multiplied by a coefficient K, when added to the linear terms described above would make the total expression a closer approximation to the desired sine function.

If the difference between the two values at $x = \frac{1}{2}$ is called K; then $K4x.(1-x)$ must equal the difference between $y = \sin x$ and $y = x$ at $x = \frac{1}{2}$, i.e. $(0.70711 - 0.5) = 0.20711$. K can be termed the residual need at $x = \frac{1}{2}$. Thus for the polynomial expression to provide the correct value of $y$ for $\sin x$ when $x = \frac{1}{2}$, the quadratic term must supply a value equal to K and the polynomial series may be written.

$$y = \tfrac{1}{2}(b+a) + \tfrac{1}{2}(b-a)\cdot 2(x-\tfrac{1}{2}) + K\cdot 4x(1-x)$$

and it will be seen by inspection that for the function $y = \sin x$, $y$ will be correct at $x$ values of 0, 1 and ½. For a second interpolation at $x = $ ¼ or ¾, interpolation will give DOWN $y_{(1/4)} = \tfrac{1}{2}[a + y_{(1/2)}]+$ (a second order correcting factor), or UP $y_{(3/4)} = \tfrac{1}{2}[y_{(1/2)} + b]+$ (a second order correcting factor), and it can be shown that the new correcting factor is K/4. For a third interpolation at $x = $ ⅛ or ⅜ or ⅝ or ⅞ as required the correcting term would be K/16 and so on.

It is therefore possible to state this as an algorithm of the form $$y_n = \tfrac{1}{2}(a_n + b_n) + K_n$$

where $n$ is the stage in the algorithm, so that at the n'th stage:

| | |
|---|---|
| UP | $a_{(n+1)} = y_n$ |
|    | $b_{(n+1)} = b_n$ |
| DOWN | $a_{(n+1)} = a_n$ |
|      | $b_{(n+1)} = y_n$ |
| UP or DOWN | $K_{(n+1)} = \tfrac{1}{4}K_n$ |

Interpolation of a polynomial expression of the form
$$y = \tfrac{1}{2}(b+a) + \tfrac{1}{2}(b-a)\cdot 2(x-\tfrac{1}{2}) + K\cdot 4x(1-x)$$
thus gives a much better approximation for the function $y = \sin x$ than linear interpolation between two end points but it will be noted that three values are required namely the values of $y$ at $x = 0$ and 1, and the value of K to perform the interpolation and in general $(n+a)$ quantities are required to perform an n'th order interpolation.

Figure 1:
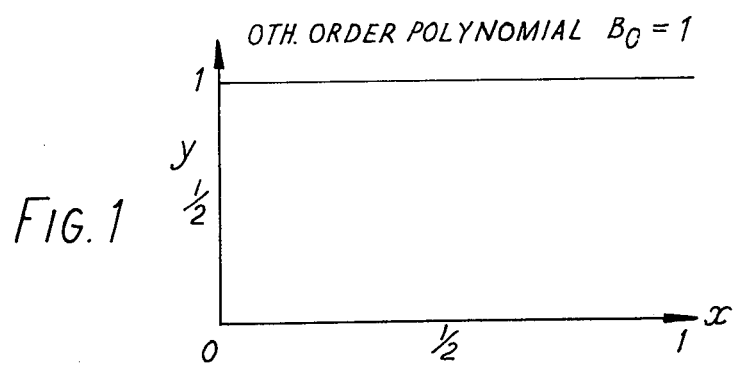
FIGS. 1 to 7 show graphs of polynomial expressions from the zero'th to the eighth order.
Figure 2:
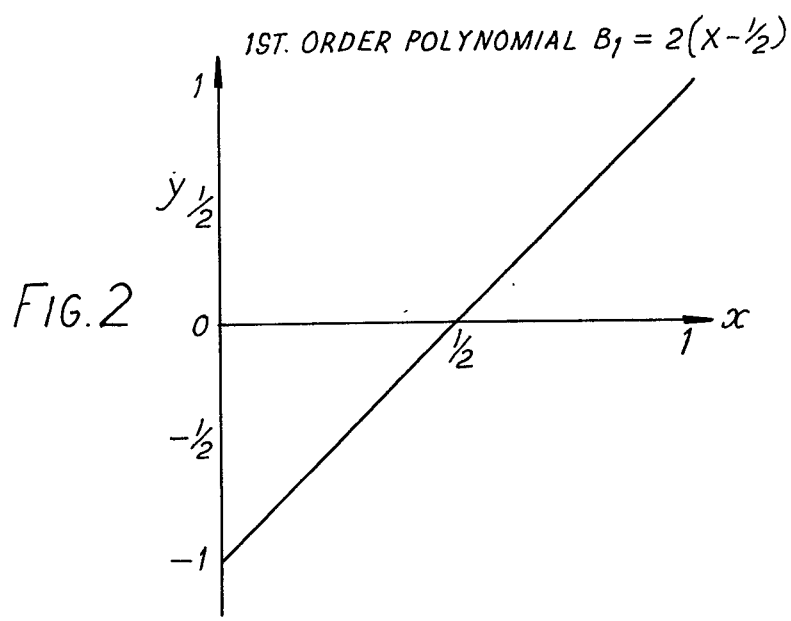
Figure 3:
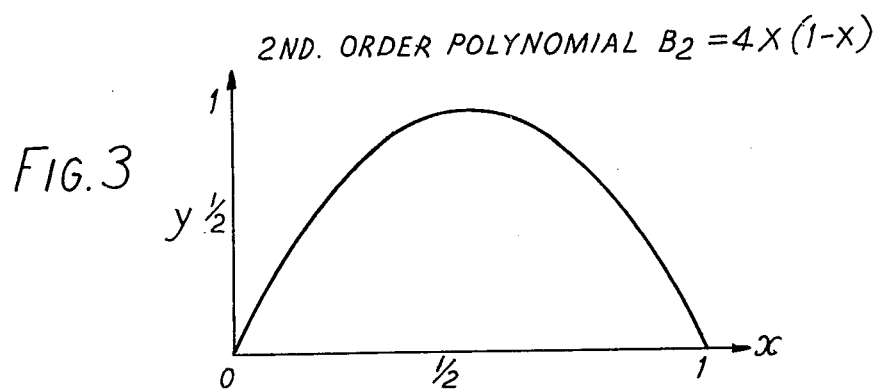

Continuing, it was mentioned that the curve 14 was not a true parabola. FIG. 3 shows a parabola of the form $y = 4x(1-x)$ and curve 16 of FIG. 9 shows a parabola of the form $K4x(1-x)$ where $K=0.20711\ldots$ The difference between the two curves 14 and 16 is shown at curve 18 in FIG. 10 and it will be seen that it is similar to that of a cubic (third order) curve. This difference curve 18 represents the error between the sine function and the above polynomial expression including the quadratic term. The reduced scale values for the ordinate $y$, will indicate the relative magnitudes in the errors depicted by curves 14 and 18.

Figure 4:
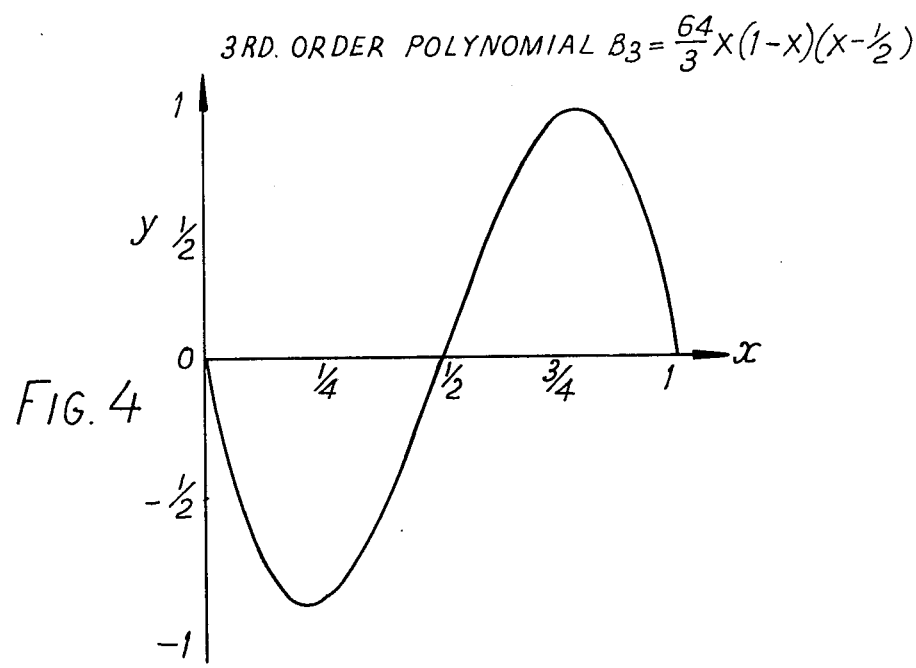

Thus the addition of a cubic term to the polynomial expression will further considerably reduce the magnitude of this difference. Curve 18 is not symmetrical about the $x$ axis and therefore to reduce the error the cubic, third order term should take the form $$B_3 = \frac{64}{3} x (1-x) \left(x - \tfrac{1}{2}\right)$$

shown at FIG. 4. In this term 64/3 is the scaling coefficient, the expression $x(1-x)$ is similar to the parabolic, second order term, and the factor $(x-\tfrac{1}{2})$ is used to ensure that the term makes zero contribution at $x = \tfrac{1}{2}$, while the negative sign causes the necessary polarity inversion. The polynomial expression may now be written as $$y = \tfrac{1}{2}(b+a) + \tfrac{1}{2}(b-a)\cdot 2\left(x-\tfrac{1}{2}\right) +$$
$$K\cdot 4x(1-x) + C\cdot \frac{64}{3} x(1-x)\left(x-\tfrac{1}{2}\right)$$

where the value of coefficient C is selected to reduce the difference between the curves 18 and 20 at $x = $ ¼ and $x = $ ¾, to values identical in amplitude and sign.

Figure 5:
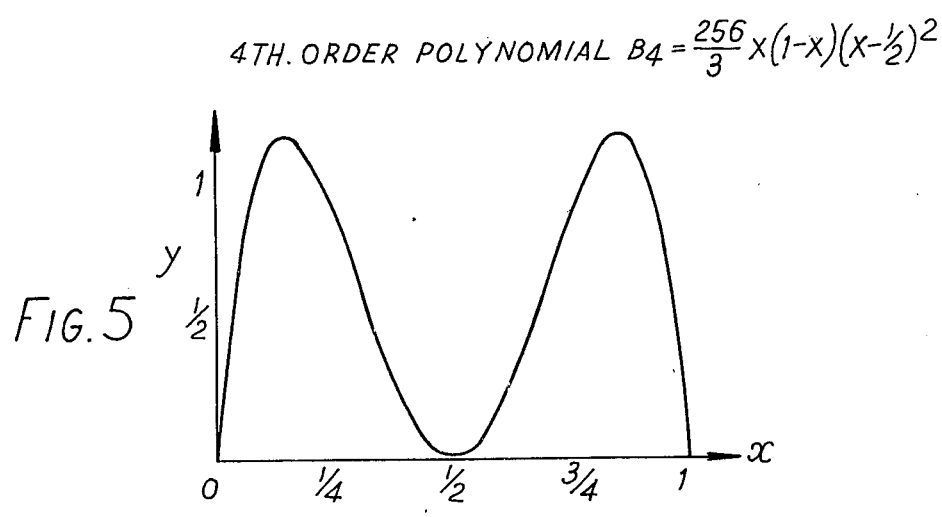
Figure 10:
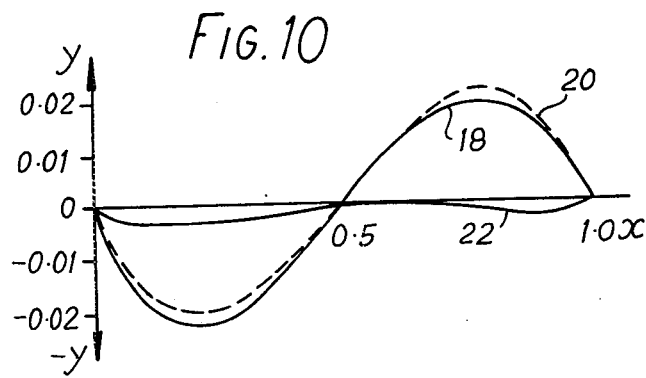
FIG. 10 shows a plot of the differences between the curve $y = \sin x$ and the curve of an expression $y = \frac{1}{2}(b+a) + \frac{1}{2}(b-a)\cdot 2(x-\frac{1}{2}) + K4x(1-x)$, that is a second order polynomial, together with a curve of the form shown in FIG. 4 multiplied by a coefficient whereby the difference between the two curves is reduced at values of $x = \frac{1}{4}$ and $x = \frac{3}{4}$ to values identical in amplitude and sign.

The difference between the true sine function and a function derived by interpolating the polynomial expression including the third order polynomial is shown as curve 22 in FIG. 10 and it will be noted that this is similar to that of a quartic (fourth order) curve (such as shown in FIG. 5), in which the errors are zero at $x = 0$, ½ and 1 and now considerably reduced, but not zero, at $x = $ ¼ and $x = $ ¾.

A fundamental rule of the binary polynomial series is that as each point of exact fit is established all subsequent polynomials must preserve this fit. That is, by employing the binary polynomial approximation including the second order term, an exact fit can be established for $x = 0$, $x = \tfrac{1}{2}$ and $x = 1$. The third order polynomial $B_3$ and all subsequent polynomials must therefore contain the term $x(1-x)(x-\tfrac{1}{2})$. Continuing with an explanation of the rule of exact fit, the rule demands that the quartic, fourth order polynomial $B_4$ must also contain the polynomial $x(1-x)(x-\tfrac{1}{2})$ as the established points of exact fit are still $x = 0$, ½ and 1. However, $B_4$ must be of the fourth order and, in this example, the required form is obtained by adding a second factor $(x-\tfrac{1}{2})$. Thus, $B_4$ contains $x(1-x)(x-\tfrac{1}{2})^2$ and FIG. 5 shows a curve of a fourth order polynomial of the form $$B_4 = \frac{256}{3} \cdot x \cdot (1-x) \cdot \left(x - \tfrac{1}{2}\right)^2$$

where 256/3 is the scaling factor.

Thus the addition of a fourth order term of the form $$Q \cdot \frac{256}{3} \cdot x \cdot (1-x) \cdot \left(x - \tfrac{1}{2}\right)^2$$

with the value of the coefficient Q so chosen that an exact fit is obtained at the values of $y$ for $x = $ ¼ and $x = $ ¾ will reduce the error still further.

The fourth order binary polynomial $$y = d_0 B_0 + d_1 B_1 + d_2 B_2 + d_3 B_3 + d_4 B_4$$

can thus be rewritten.

$$y = \tfrac{1}{2}(b+a) + \tfrac{1}{2}(b-a)\cdot 2x + K\cdot 4x(1-x) +$$
$$C \cdot \frac{64}{3} x(1-x)\left(x - \tfrac{1}{2}\right) +$$
$$Q \cdot \frac{256}{3} x(1-x)\left(x - \tfrac{1}{2}\right)^2$$

The algorithm can be written:

$$y_n = \frac{1}{2}(a_n + b_n) + K_n$$

where $$K_{(n+1)} = \frac{1}{4} K_n \begin{bmatrix} -D \\ +U \end{bmatrix}_{n+1} C_n + Q_n$$

$$C_{(n+1)} = \frac{1}{8} C_n \begin{bmatrix} -D \\ +U \end{bmatrix}_{n+1} Q_n/2$$

$$Q_{(n+1)} = \frac{1}{16} Q_n$$

the coefficients $d_0$, $d_1$, K, C and then readily be determined on a simple alegbraic basis as more fully explained in the aforementioned patent specifications.

Method including flow charts and apparatus for interpolating such polynomials including a fourth order polynomial are fully described in the aforementioned specifications but for ease of explanation a statement of a fourth order Binary Polynomial Algorithm implemented by means of a method described in the aforementioned specifications is shown at Table 1 below for completeness.

TABLE 1

| Register | Initial conditions | Held at 'n'th stage start | Algorithm statement 'n'th stage, sequenced as listed |
|---|---|---|---|
| y | none | $y_{n-1}$ | $y_n = \frac{1}{2}(a_n + b_n) + K_n$ |
| a | a at n = 1 | $a_n$ | $a_{n+1} = y_n$ if Up at (n + 1)th<br>$a_n$ if Down at (n + 1)th |
| b | b at n = 1 | $b_n$ | $b_{n+1} = b_n$ if Up at (n + 1)th<br>$y_n$ if Down at (n + 1)th |
| K | K at n = 1 | $K_n$ | $K_{n+1} = \frac{K_n}{4} \begin{bmatrix} -D \\ +U \end{bmatrix}_{n+1} C_n + Q_n$ |
| C | C at n = 1 | $C_n$ | $C_{n+1} = \frac{C_n}{8} \begin{bmatrix} -D \\ +U \end{bmatrix}_{n+1} \frac{Q_n}{2}$ |
| Q | Q at n = 1 | $Q_n$ | $Q_{n+1} = \frac{Q_n}{16}$ |

The polarity operator $$\begin{bmatrix} -D \\ +U \end{bmatrix}_{n+1}$$

simply means that the coefficient it qualifies is subtracted if the interpolation is DOWN, that is to be performed for a lower segment of $x$, at the $(n+1)$th step and added if it is UP, that is to performed for the higher segment of $x$.

If $y$ were expressed as an eighth order polynomial a fourth order appoximation would leave a residual need which could be expressed as a polynomial containing the fifth to eighth order polynomials.

Thus to implement the algorithm up to the fourth order polynomial it would be necessary to know the values of the coefficients $a$, $b$, K, C and Q which may conveniently be derived from a knowledge of five points values of $y$ at specific values of $x$, namely at $x = 0, ¼, ½, ¾, 1$.

The above polynomial series can be extended *ad infinitum* a convenient progression would be to extend the series to the eighth order and arrange that the coefficients $d_5$ to $d_8$ for the fifth to eighth order polynomials $B_5$ to $B_8$ in combination obtain exact fits for the function at the odd ⅛ values of $x$. To implement an eighth order polynomial interpolation it is necessary to know nine specific quantities such as the nine point values of $y$ at specific values of $x$, namely at $x = $ , ⅛, ¼, ⅜, ½, ⅝, ¾, ⅞, 1.

The coefficients $d_0$, $d_1$, K, C and Q of the binary polynomials are defined as those coefficients which give rise to an exact fit at the end points $x = 0$, 1 and the binary sequence of $x$ values at ½, ¼ and ¾. It is assumed that the five point values $y_{(0)}$, $y_{(1/4)}$, etc. of the function to be approximated are known. The values of In devising the particular algorithm statement to be described certain assumptions were made to provide a preferred implementation of the method for a particular application and certain options were taken but these assumptions and options should not, of course, be regarded as limitations of the scope of the invention. Some of these assumptions and options were:

1. Digital quantities representative of point values defining a segment and correcting terms are provided in fixed point notation 2's complement code.
2. Statements will be valid within an area bounded by the 0 to 1 range in both $X$ and $Y$. It should be noted that bipolar coefficients and terms arise, despite the above unipolar limitations.
3. An "ideal" algorithm will directly generate any fourth order function which can be drawn in the area bounded by the 0 to 1 range of $x$ and $y$, providing that between the $x$ range limits, the function does not intersect either of the lines $y = 0$ or $y = 1$.

Corner intersection (i.e. at $x = 0$ or $x = 1$) and tangential contact (i.e. of $y = 0$ or $y = 1$ lines) are both permitted.

Consider a function of $x$ to be represented by a general polynomial expression:

$$y = d_0 B_0 + d_1 B_1 + d_2 B_2 + d_3 B_3 + d_4 B_4$$

where $B_n$ is a linear polynomial expression in $x$ of the $n$th order, and $d_n$ is the relevant addressed coefficient specifying amplitude.

As aforementioned the concept of "Binary Polynomials" requires that points of exact fit be established and retained in a binary sequence of $x$ values such as the following preferred sequence

| Polynomial group | Results in exact fits at the x values: |
|---|---|
| $B_0$ and $B_1$ | 0 and 1 |
| $B_2$ | 1/2 |
| $B_3$ and $B_4$ | 1/4 and 3/4 |

| Polynomial group | Results in exact fits at the x values: |
|---|---|
| $B_5$, $B_6$, $B_7$ and $B_8$ $B_9$ to $B_{16}$ inclusive | 1/8, 3/8, 5/8 and 7/8 (odd 1/16 fractions) - 1/16 to 15/16 inclusive | and so on.

Each polynomial group achieves the exact fits at the next group of x values in binary sub-division.

The algebraic factors of each polynomial are either uniquely determined, or guided, by the requirements of exact fit. A numeric scaling factor is in each case chosen to give a polynomial peak value as near to unity as possible; this choice being consistent with the implementation of interpolation in a convenient add-shift organisation, wherein, for example, digital values are held in shift registers and division by a power of 2 is effected by shifting the digital number the appropriate number of places in its register.

Various options are available for the algebraic factors of a given Binary Polynomial. The first options arise for the $B_0$ and $B_1$ pair of polynomials. It would have been possible to use the polynomial $B_0$ to achieve exact fit at $x = 0$ and the polynomial $B_1$ to achieve exact fit at $x = 1$. The decision was not to take this course but to employ and $B_0$ and $B_1$ pair simultaneously to obtain exact fits at $x = 0$ and $x = 1$. A similar situation arises for the $B_3$ and $B_4$ pair of polynomials. Ever increasing numbers of options arise for each higher order group through the possibilities of fit as a collective polynomial group, as pairs of polynomials, as individual polynomials, and in different fit sequence.

It is believed that general advantage can be obtained by retaining, for each polynomial, the condition of odd or even symmetry about the x domain centre, that is, the initial segment of x (see Binary Polynomial graphic forms illustrated at FIGS. 1 to 5 wherein the initial segment extends from $x = 0$ to $x = 1$ and the x domain centre is at $x = \frac{1}{2}$).

This decision to retain such symmetry eliminates options from the $B_0/B_1$ and $B_3/B_4$ pairs. A reduction of options also results within each of the higher order groups.

The polynomial $y = d_0 B_0 + d_1 B_1 + d_2 B_2 + d_4 B_4$ can thus be illustrated by the following Table 2:

TABLE 2

| Polynomial order | Coefficient designation ($d_n$) | Binary Polynomial ($B_n$) |
|---|---|---|
| '0'th | ½(b + a) | $B_0 = 1$ |
| 1st | ½(b − a) | $B_1 = 2(x − 1\frac{1}{2})$ |
| 2nd | K | $B_2 = 4x(1 − x)$ |
| 3rd | C | $B_3 = 64/3\ x(1 − x)(x − \frac{1}{2})$ |
| 4th | Q | $B_4 = 256/3\ x(1 − x)(x − \frac{1}{2})^2$ |

The designated coefficients for the fourth order approximation may be readily derived from five function samples equispaced in the x domain:

| x value | y value |
|---|---|
| 0 | $y_0 = a$ |
| ¼ | $y_{¼} = \frac{3}{4}a + \frac{1}{4}b + \frac{3}{4}K − C + Q$ |
| ½ | $y_{½} = \frac{1}{2}(a + b) + K$ |
| ¾ | $y_{¾} = \frac{1}{4}a + \frac{3}{4}b + \frac{3}{4}K + C + Q$ |
| 1 | $y_1 = b$ |

The resulting fourth order approximation is:

$$y = \frac{1}{2}(b + a) \cdot B_0 + \frac{1}{2}(b − a) \cdot B_1 + K \cdot B_2 + C \cdot B_3 + Q \cdot B_4$$

In general, the algorithm progresses from stage to stage, interpolating the stored function at a sequence of x values which constitute successive bisection of the x domain. The algorithm starts its operation holding point values of y at the x values 0 and 1, and values of the coefficients K, C, Q.

The first algorithm stage ($n=1$) always interpolates the stored function at $x = \frac{1}{2}$ ($y$ is determined at $x = \frac{1}{2}$).

The second algorithm stage ($n=2$) interpolates $y$ at the x value ¼ or ¾, depending upon whether the stage steps DOWN ($x=¼$) or UP ($x=¾$).

The third algorithm stage ($n=3$) similarly interpolates $y$ at an x value ⅛, ⅜, ⅝ or ⅞, depending upon whether the stage steps DOWN or UP from the interpolated value at $x = ¼$ or ¾ and so on.

The DOWN or UP direction taken on a given algorithm stage, must therefore be determined. If the value of $y$ is being calculated for a given value of $x$ this is done by considering the 0 or 1 state respectively, which occurs for a particular bit of x. The $n$'th fractional fit of x determines the DOWN or UP direction taken at the ($n+1$)th stage of the algorithm.

An example will now be given which starts with a register holding a value of x as a 2's complement fractional number:

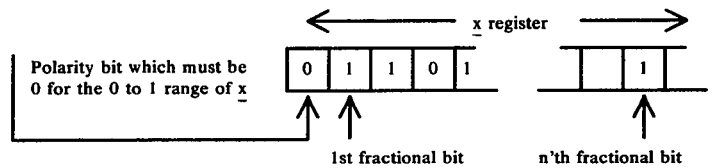

A single left shift is operated to remove the redundant polarity bit:

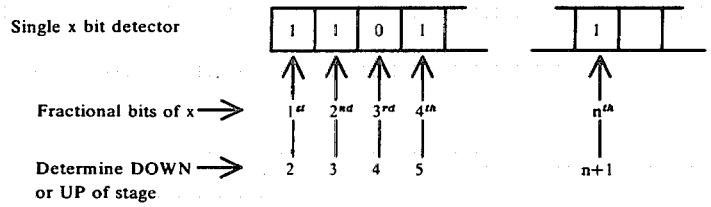

A single left shift is operated upon each algorithm stage.

Before considering the algorithm statement of Table 1 in more detail, it should be explained that, as hereinbefore described with reference to Table 1 certain terms in the algorith require a polarity operator signifying subtraction or addition before updating the correcting term and, possibly another term or terms. Consider an 'n'th stage algorithm term:

$$\left[\begin{matrix} -D \\ +U \end{matrix}\right]_{n+1} C_n$$

This stagement calls for the value of $C_n$ to be subtracted or added on the 'n'th algorithm stage when updating the compensating term for the next stage ($n+1$) of the algorithm, in accordance with the "state" of a particular $x$ bit, that is:

| $C_n$ is added if the step is UP at the (n + 1)th stage, which requires that the 'n'th fractional bit of x is 1. | $C_n$ is subtracted if the step is DOWN at the (n +1)th stage, which requires that the 'n'th fractional bit of x is 0. |
|---|---|

If the value of $x$ is being determined for a given value of $y$ (i.e. inverse interpolation) the interpolated value of $y$ is compared with the given value of $y$ to establish whether the next stage steps DOWN or UP, and a corresponding 0 or 1 is entered in the $x$ register.

Referring now to the algorithm statement shown in Table 1, point of $a$ and $b$ at $x=0$ and $x=1$ defining the initial segment of $x$, and values of the second, third and fourth order coefficients K, C and Q respectively are stored for the first stage ($n=1$) of the algorithm, and $y$ is to be determined for a given value of $x$. The algorithm then proceeds, stage by stage, as follows:

Stage 1, $n = 1$ i. $y$ is interpolated at $x = \frac{1}{2}$ by linearly interpolating between the point values $a$, $b$ to obtain a midpoint value and corresponding the mid-point value by the addition of K to obtain $y_{(n=1)} = \frac{1}{2}(a+b) + K$ ii. The first fractional bit of $x$ is examined as hereinbefore described to determine whether to step UP to the new segment between $x = \frac{1}{2}$ and $x = 1$ or DOWN to the segment between $x = 0$ and $x = \frac{1}{2}$ at the next stage $(n+1) = 2$.

iii. If the decision is to step DOWN (to interpolate at $x = \frac{1}{4}$) $a$ is retained and $y_{(n=1)}$ is substituted for $b$. (In general this may be stated as $D: a_{n+1} = a_n$ and $b_{n+1} = y_n$. Similarly if the decision is to step UP (to interpolate at $x = \frac{3}{4}$) $b$ is retained but $y_{(n=1)}$ is substituted for $a$ (U: $a_{n+1} = y_n$ and $b_{n+1} = b_n$).

iv. K is updated (to $K_{n+1} = K_2$) by dividing K by 4 and subtracting C if the decision is to step DOWN adding C if the decision is to step UP adding Q so that $$K_2 = K/4 \left[\begin{matrix} -D \\ +U \end{matrix}\right]_{\text{stage 2}} C + Q$$

and in general $$K_{(n+1)} = \frac{K_n}{4} \left[\begin{matrix} -D \\ +U \end{matrix}\right]_{n+1} C_n + Q_n$$

v. C is updated to $[C_{(n+1)} = C_{(n=2)}]$ by dividing C by 8 and subtracting Q/2 if decision is to step DOWN or adding Q/2 if decision is to step UP so that $$C_{(n=2)} = C/8 \left[\begin{matrix} -D \\ +U \end{matrix}\right]_{\text{stage 2}} Q/2 \text{ and}$$

in general $$C_{(n+1)} = \frac{C_n}{8} \left[\begin{matrix} -D \\ +U \end{matrix}\right]_{n+1} \frac{Q_n}{2}$$

vi. Q is updated to $[Q_{(n+1)} = Q_{(n=2)}]$ by dividing Q by 2 for use at (v) above and further dividing Q/2 by 8 to obtain $Q_{(n=2)} = Q/16$ and in general $$Q_{(n+1)} = \frac{Q_n}{16}$$

Stage 2, $n = 2$

Depending upon the decision to step UP or DOWN, $y_{(n=2)}$ is interpolated at $x = \frac{1}{4}$ or $x = \frac{3}{4}$ to obtain $y_{(n=2)} = \frac{1}{2}(a_2 + b_2) + K_2$ and then steps (ii) to (v) are repeated prior to interpolation of $y_{(n=3)}$ at Stage 3. This process is repeated whereby the segment of $x$ is successively bisected such that the point values $a_{(n=1)}$, $b_{(n+1)}$ converge upon the given value of $x$ for which $y$ is to be determined.

A method of determining the polynomial coefficients is described in detail in U.K Pat. Specification No. 1,363,073 (U.S. Specification No. 3,789,203).

FIG. 11 shows a simplified block circuit diagram of a data processing apparatus for implementing the algorithm. The apparatus 10 comprises a Serial Random Access Memory (RAM) 12 organised as a plurality of 20-bit shift registers, two 20-bit registers (SR) 14, 16 depicted as SRA and SRB respectively and a full adder 18.

The RAM 12 has its input 12a coupled to an input selector means 22 having a switch S1, shown as a simple mechanical switch, having a movable contact S1a selectively connectable to one of two fixed contacts S1b and S1c. Contact S1b is coupled to an input terminal 24 arranged to receive, in operation, the point values a and b and the correcting terms K, C and Q in the form of 20-bit words in 2's complement fractional binary code. The five binary words a, b, K, C and Q are fed to five 20-bit registers of the RAM 12 serially under the control of a master clock-pulse generator 26. The connections from the generator 26 to the various parts of the circuit 10 such as the RAM and to the clock pulse inputs of the shift registers and other control circuitry have been omitted as their design would be obvious to a competent logic designer and their explanation would only tend to confuse the present description. Contact S1c is coupled to the output 18c of the adder 18.

A shift-register input selector circuit 28 has outputs 28a and 28b respectively connected to the inputs 14a, 16a of the two shift registers 14 and 16. The selector circuit 28 has four inputs 28c, d, e, f; input 28c being connected to output 12b of the RAM 12, 28d to the output 18c of the adder 18, 28e to the output 14b of the shift register 14, and 28f to the output 16b of shift register 16. Any one of the inputs 28c to 28f can be selectively coupled to either of the outputs 28a and 28b.

The outputs 14b, 16b of the shift registers 14, 16 are coupled to the adder by way of an adder logic circuit 30 which can be controlled according to the UP/DOWN determination to add or subtract a selected one of its inputs from the other.

A 16-bit shift register 32 designated SRx is provided for storing the given value of x, set by an x input circuit 34, for which the value of y is to be obtained. The value of the independent variable x is stored in 2's complement fractional binary code. An UP/DOWN detector 36 is coupled to receive the most significant fractional bit of x, ignoring the polarity bit, and to set the adder logic circuit 30 accordingly when updating the correcting terms as hereinbefore described.

A comparator circuit 38 is provided having inputs connected to each stage of the SRx register 32 and is arranged to detect when all of the x bits are zero to provide an output signal to terminate the interpolation. As aforementioned the number in the SRx register 32 is shifted one place for each stage in the algorithm so that the first bit to be interrogated is the most significant bit after the polarity bit has been removed.

A 16-bit shift register 40, designated SRy, is connected to the output 18c of the adder to receive the interpolated value of y.

In operation digital numbers are written-in and read-out from the RAM 12 and are processed through the shift registers under the control of clock pulses from the generator 26. Division of a digital number in a shift register by a power of 2 is effected by shifting the number the appropriate number of places. The digital numbers are presented to the RAM and the shift registers SRA, SRB and SRy as 20-bit numbers although the final result taken from SRy may be confined to a 16-bit number. This is to obviate the need for correction of rounding errors during interpolation.

It is believed that operation of the circuit 10 to interpolate the value of the dependent variable y for a given value of the independent variable x can conveniently be described by a series of statements. In the statements, a shorthand is adopted using the references of FIG. 11, whenever possible, viz. "28c to 28a" means that the input 28c of the shift register selector circuit 28 is connected to the output 28a.

OPERATION:

1. S1a to S1b. Write a, b, K, C, Q into RAM as a series of 5 × 20-bit words.

Stage 1, n = 1

2. 28c to 28a - Read a from RAM and write into SRA.
3. 28c to 28b - Read b from RAM and write into SRB.
4. Shift a 1-bit in SRA = a/2.
5. Shift b 1-bit in SRB = b/2.
6. Adder logic 30a + 30b; 28d to 28b.
7. Add, output $18c = (a+b)/2$ and write into SRB.
8. 28c to 28a - Read K from RAM and write into SRA.
9. Adder logic 30a + 30b; Add output $18c = (a+b)/2 + K = y_1 = y_{(x=\,)}$, and S1a to S1c write $y_1$ into RAM and into SRy.

Update coefficients

10. Interrogate first, most significant, fractional bit of x to determine whether the next stage of the algorithm steps UP (interpolate y at x = ¾) or DOWN (interpolate y at x = ¼).

If x bit = 1, step UP: If x bit = 0, step DOWN.

Update point values, a and b 11. i. If x = 1 step UP at Stage 2, retain b in RAM and substitute y for a;

11. ii. if x = 0 step DOWN at Stage 2; retain a in RAM and substitute y for b.

Update K 12. 28c to 28b - Read K from RAM and write into SRB.
13. Shift K 2-bits in SRB = K/4.
14. 28c to 28a - Read C from RAM and write into SRA.
15. i. If x = 1, step UP at Stage 2.

Adder logic 30a + 30b Add - output $18c = K/4 + C$ and 28d to 28b write (K/4 + C) from adder 18 into SRB,

OR 15. ii. If x = 0, step DOWN at Stage 2. Adder logic 30b − 30a Add - output $18c = K/4 - C$ and 28d to 28b write (K/4 − C) from adder 18 into SRB.

16. 28c to 28a - Read Q and write into SRA.
17. Adder logic - 30a + 30b. Add output $$18c = K/4 \begin{bmatrix} -D \\ +U \end{bmatrix} C + Q = K_{n=2}$$

stage 2 and S1a to S1c write $K_{n=2}$ into RAM.

Update C 18. 28c to 28b. Read C from RAM and write into SRB.
19. 28c to 28a. Read Q from RAM and write into SRA.
20. Shift C 3-bits in SRB = C/8.
21. Shift Q 1-bit in SRA = Q/2.
22. i. If UP at step 10, Adder logic 30a + 30b Add - output $18c = C/8 + Q/2 = C_2$, and S1a to S1c - write $C_2$ in RAM and 28e to 28a - Q/2 in SRA.

OR 22. ii. If DOWN at step 10, Adder logic 30b − 30a Add - output $18c = C/8 - Q/2 = C_2$, and S1a to S1c - write $C_2$ in RAM and 28e to 28a - Q/2 in SRA.

Update Q

23. Shift Q/2 in SRA 3-bit = Q/16 = $Q_2$

24. Adder logic $30a + 30b$ (zero). Add, output $18c = Q/16 = Q_2$ and S1a to S1c - write Q/16 into RAM.

Stage 2, $n = 2$ - Repeat steps 2 to 24.

Thus it will be seen that there is provided an iterative interpolation method wherein all of the algorithm stages are identical and each coefficient is entered to the appropriate register, in singularity, at the start of the algorithm (that is no delayed entry requirement) and only a single $x$-bit is required to control each stage of the algorithm.

When polynomial approximation is needed for a plurality of functions, it may be found that a given polynomial order will meet most of the requirements, but a small number of the functions will require a higher order approximation. The invention now to be described provides a method whereby hardware or software organised for nth order interpolation can be utilised to yield up to $mn$th order interpolation in $m$ interpolations.

The description will concentrate upon a particular case of a fourth order interpolation method arranged to provide an eighth order interpolation in two operations.

However, the method may be used at higher or lower basic orders, applied to other polynomials, and operated for further extension of order by employing more than two recursions of interpolation.

As aforementioned to perform a fourth order interpolation it is preferable to have knowledge of the function to be interpolated in the form of five function values equispaced in the $x$ range 0 to 1.

Thus in the example to be described it is preferable that function definition be made by way of nine function values equispaced in the $x$ range 0 to 1.

The five function values $y_0$, $y_{1/4}$, $y_{1/2}$, $y_{3/4}$, and $y_1$ will be stored in the normal manner for subsequent coefficient determination and interpolation of the fourth order approximation as described.

Assume that the eighth order polynomial interpolation to be performed is described by:-

$$y = d_0B_0 + d_1B_1 + d_2B_2 + d_3B_3 + d_4B_4 + d_5B_5 + d_6B_6 + d_7B_7 + d_8B_8$$

where $d_n$ is the $n$th order coefficient and $B_n$ is a linear polynomial of $x$ of the $n$th order. If the coefficients $d_0$, $d_1$, $d_2$, $d_3$, and $d_4$ are determined from the five point values $y_{(0)}$, $y_{(1/4)}$, $y_{(1/2)}$, $y_{(3/4)}$, $y_{(1)}$, and a combined interpolation of the zero order to fourth order terms performed, the value of $y$ so obtained would fall short of the eighth order polynomial definition to the extent of the "residual need" above the fourth order.

The residual need $z$, beyond the fourth order approximation, is $$z = d_5B_5 + d_6B_6 + d_7B_7 + d_8B_8$$

The residual need $z$ may be factorised into an expression comprising the product of two constituents, of which one is a fourth order polynomial of $x$ and the other is the sum of four polynomials ranging from the fourth to the first order inclusive each multiplied by its appropriate coefficient. Thus, factorising $$z = [d_5H_1 + d_6H_2 + d_7H_3 + d_8H_4] \cdot G_4$$

where $H_1$, $H_2$, $H_3$ and $H_4$ are specific polynomials of the first, second, third and fourth order respectively.

For a specific value of $x$ the constituent, containing the first to fourth order polynomials will be a numeric value and the expression for the residual need can be rewritten as $$z = g_4G_4$$

If it could be arranged that the polynomials $H_1$, $H_2$ $H_3$ and $H_4$ were in fact the same polynomials as $B_1$, $B_2$, $B_3$ and $B_4$ respectively, the value of $g_4$ could readily be determined for a particular value of $x$. This would simply require that a loading of the coefficients O, $d_5$, $d_6$, $d_7$, and $d_8$ be made to a fourth order interpolation such as described with reference to FIG. 11 (normally loaded with $d_0$, $d_1$, $d_2$, $d_3$ and $d_4$ respectively), and an interpolation operation performed.

Even if the polynomials $H_1$, $H_2$, $H_3$ and $H_4$ differ from $B_1$, $B_2$, $B_3$ and $B_4$, but of course remain of equivalent order, it is still possible to determine $g_4$ by use of a fourth order interpolation method, but the five coefficients become combinations of $d_5$, $d_6$, $d_7$ and $d_8$ rather than the unique values.

The determination of the coefficient $g_4$ will be described later.

For a given value of $x$ the eighth order polynomial approximation can thus be rewritten as $$y = d_0B_0 + d_1B_1 + d_2B_2 + d_4B_4 + g_4G_4$$

If the common fourth order polynomial $G_4$ is equivalent to the polynomial $B_4$ then it would be necessary merely to modify the fourth order coefficient $d_4$ by consolidating it with the specific fourth order coefficient $g_4$ of the polynomial $G_4$ and the expression would become $$y = d_0B_0 + d_1B_1 + d_2H_2 + d_3B_3 + (d_4 + g_4)B_4$$

If the polynomials $G_4$ and $B_4$ are different then it may be necessary to modify more than one of the fourth or lower order coefficients d to consolidate the specific coefficient $g_4$.

The binary polynomials and their relevant coefficient designations, previously selected for fourth order approximation in the 0 to 1 $x$ range, are shown in the following Table 3:

TABLE 3

| Coefficient designation (dn) | Binary Polynomial (Bn) |
|---|---|
| $d_0 = \dfrac{b+a}{2}$ | $B_0 = 1$ |
| $d_1 = \dfrac{b-a}{2}$ | $B_1 = 2\left(x - \dfrac{1}{2}\right)$ |
| $d_2 = K$ | $B_2 = 4x(1-x)$ |
| $d_3 = C$ | $B_3 = \dfrac{64}{3}x(1-x)\left(x - \dfrac{1}{2}\right)$ |
| $d_4 = Q$ | $B_4 = \dfrac{256}{3}x(1-x)\left(x - \dfrac{1}{2}\right)^2$ | and the polynomials and their coefficients for the fourth to eighth orders, in accordance with a preferred method according to the invention, are:-

$d_5 = 1$  $B_5 = 128x(1-x)\left(x - \dfrac{1}{2}\right)\left(x - \dfrac{1}{4}\right)\left(x - \dfrac{3}{4}\right)$ -continued $d_6 = S \quad B_6 = 256x(1-x)\left(x-\frac{1}{2}\right)^2\left(x-\frac{1}{4}\right)\left(x-\frac{3}{4}\right)$ $d_7 = P \quad B_7 = \frac{2^{12}}{3} x^2(1-x)^2 \left(x-\frac{1}{2}\right)\left(x-\frac{1}{4}\right)\left(x-\frac{3}{4}\right)$ $d_8 = E \quad B_8 = \frac{2^{14}}{3} x^2(1-x)^2 \left(x-\frac{1}{2}\right)\left(x-\frac{1}{4}\right)\left(x-\frac{3}{4}\right)$ It will be remembered that it is a fundamental rule of methods using the binary polynomial series that as each point of exact fit is established all subsequent polynomials must preserve this fit. Thus all polynomials above the fourth order must make zero contribution at the $x$ valves 0, ¼, ½, ¾, and 1. All such polynomials must therefore contain $x(1-x)(x-½)(x-¼)(x-¾)$ Just as it was preferred to consider the polynomials $B_3$ and $B_4$ as a pair which were arranged collectively to achieve exact fits for the function at values of $x$ equal to ¼ and ¾; in the preferred method according to the invention the polynomials $B_5$, $B_6$, $B_7$ and $B_8$ will be considered as a group which is to be so arranged that collectively they achieve exact fit at the odd one eighth values of $x$.

Figure 8:
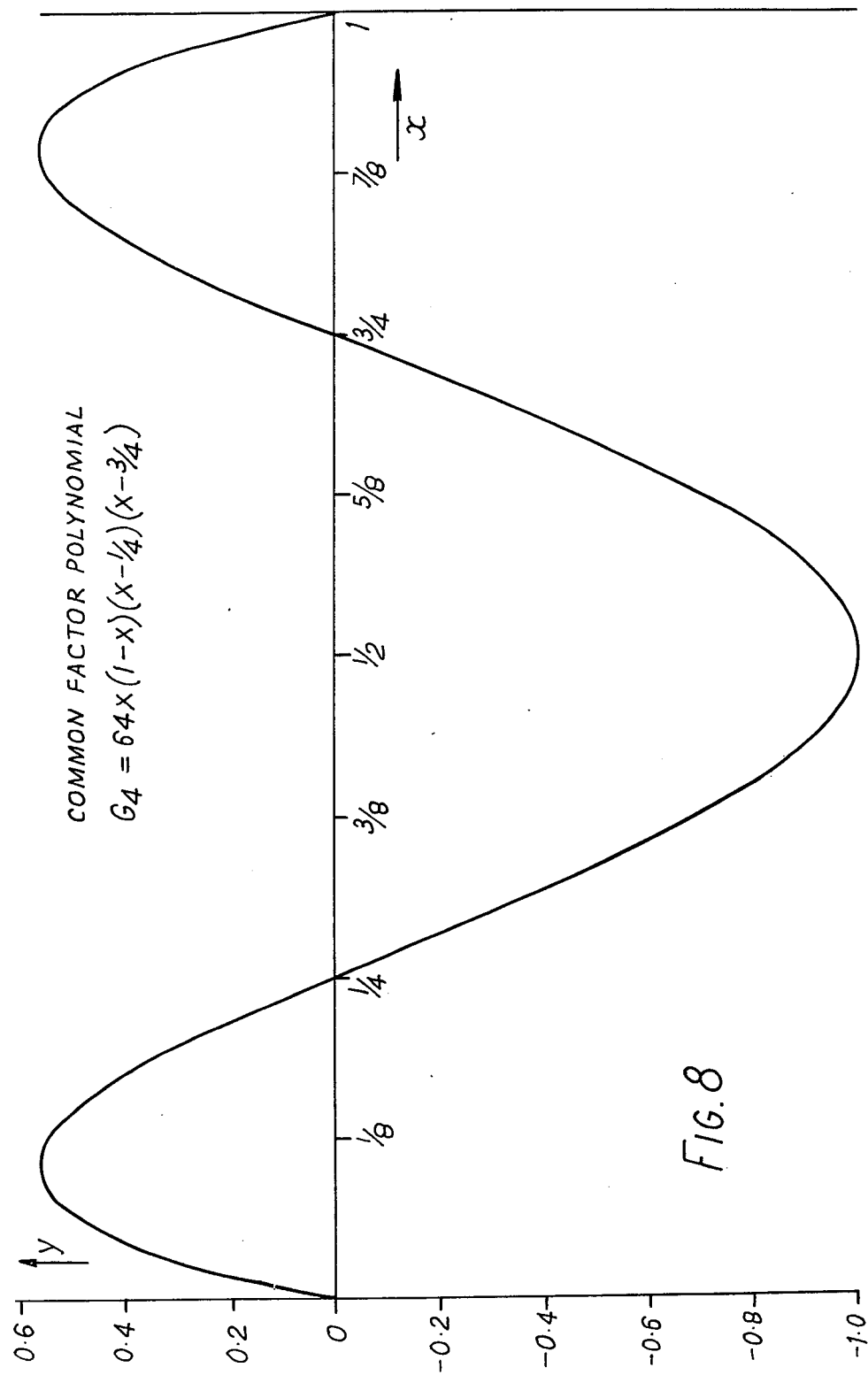
FIG. 8 shows a graph of a common factor fourth order polynomial expression useful in describing the invention.

When factorising the expression for the residual need $z$, it is first necessary to derive a fourth order polynomial which is common to the fifth to eighth order polynomials listed in Table 3. Following the fundamental rule, it is necessary to derive a common polynomial which will establish four of five required zeros at $x$, $(1-x)$, $(x-½)$, $(x-¼)$ and $(x-¾)$. In the development of the preferred method it was believed that only disadvantage would result from abandoning the principle of symmetry, whereby each polynomial retains "odd" and "even" symmetry about $x = ½$. This belief in symmetry thus enables the elimination of the factor $(x-½)$ and so the $x$ dependent part of $G_4$ is $x(1-x)\left(x-\frac{1}{4}\right)\left(x-\frac{3}{4}\right)$ and $G_4 = 64 x(1-x)\left(x-\frac{1}{4}\right)\left(x-\frac{3}{4}\right)$ where the scaling factor 64 is chosen to make $G_4 = -1$ at $x = ½$. FIG. 8 shows this common fourth order polynomial $G_4$ in graphic form. It should be emphasised that the common fourth order polynomial could take other forms, provided of course, that it is of the fourth order and is common to each of the fifth to eighth order polynomials, but this is found to be a convenient one for the method.

Having derived the common fourth order polynomial the next step in factorising the expression for the residual need is to derive the polynomials $H_1$ to $H_4$ in the expression $z = g_4G_4 = G_4[d_5H_1 + d_6H_2 + d_7H_3 + d_8H_4] = G_4[I \cdot H_1 + S \cdot H_2 + P \cdot H_3 + E \cdot H_4]$ and this is achieved by dividing the polynomials $B_5$ to $B_8$ listed in Table 3 by the established expression for $G_4$, that is;

$g_4 = I \cdot 2\left(x-\frac{1}{2}\right) + S4\left(x-\frac{1}{2}\right)^2 + P \cdot \frac{64}{3} x \cdot (1-x)\left(x-\frac{1}{2}\right)$ $+ E \cdot \frac{256}{3} x(1-x)\left(x-\frac{1}{2}\right)^2$ If the polynomials $H_1$ to $H_4$ were the same as the polynomials $B_1$ to $B_5$, the coefficients I, S, P and E could be regarded as equivalent to the coefficients $d_1$ to $d_4$ respectively of a fourth order polynomial and a fourth order polynomial interpolation performed as described to obtain the value of $g_4$ at a given value of $x$. Clearly in this case they are not and so the coefficients must be modified. Examination of the polynomial expression derived above for $g_4$ indicates that the third and fourth order polynomial expressions $H_3$ and $H_4$ are the same as the polynomials $B_3$ and $B_4$ respectively. Therefore the coefficient P and E can be used directly as the coefficients C and Q in a fourth order interpolation and will be designated $Nc$ and $Nq$ respectively. However, the second order term for $H_2$ which is $4(x-½)^2$ is not the same as that for $B_2$ which is $4x(1-x)$ although they are not by definition, of the same order. It is necessary therefore to factorise the two polynomials to obtain a value of a coefficient for the $x^2$ term which can be regarded as the coefficient K in the fourth order interpolation. It can be shown that the coefficient, which will be designated NK is $-S$. This will leave a first order term in $x$ which will have to be "pushed down" to be considered with the $H_1$ polynomial when deriving the zero'th and first order coefficients for a fourth order interpolation. Thus although $H_1$ is the same as $B_1$, the coefficients will be modified and it can be shown that $(S-I)=N_a$ is equivalent to $a$ and $(S+I)=N_b$ is equivalent to $b$ in terms of a fourth order interpolation.

Thus by examination of the polynomials up to the fourth order, interpolation of $g_4$ for a given value of $x$ will be obtained by loading into the RAM 12 of the apparatus of FIG. 11

$S - I$ into a 'a' register
$S + I$ into the 'b' register
$-S$ into the 'K' register
P into the 'C' register
E into the 'Q' register Having derived the common fourth order polynomial $G_4$, the polynomials $H_1$ to $H_4$ and their coefficients and used the coefficients to perform a fourth order interpolation to determine the specific coefficient $g_4$, the next step in the method is to modify, as required, the zero'th to fourth coefficients $d_0$ to $d_4$ to consolidate the $g_4G_4$ term before performing a second fourth order interpolation. This may be explained by initially considering as an example a fourth order interpolation in which $a$, $b$ and C are made equal to zero, K is made equal to $-g_4$ and Q is made equal to ¾$g_4$. By examination of the second and fourth order polynomials (Table 3) it can be shown that the interpolated result will be $$g_4 \cdot 64x(1-x)\left(x-\frac{1}{4}\right)\left(x-\frac{3}{4}\right) = g_4 G_4,$$

as follows: Interpolation of a 4th order expression, in accordance with the statements of Table 3, is given by, $$y = \frac{(b+a)}{2} \cdot B_0 + \frac{(b+a)}{2} \cdot B_1 + K \cdot B_2 + C \cdot B_3 + Q \cdot B_4$$

In the particular case where $$a = 0; b = 0; K = -g_4; C = 0; Q = \frac{3}{4} g_4$$

$$y = -g_4 B_2 + \frac{3}{4} g_4 B_4$$

Substituting for $B_2$ and $B_4$ $$y = -g_4 \cdot 4x(1-x) + \frac{3}{4} g_4 \cdot \frac{256}{3} \cdot x(1-x)\left(x-\frac{1}{2}\right)^2$$

$$= 4g_4 \cdot x(1-x)\left[-1 + 16\left(x^2 - x + \frac{1}{4}\right)\right]$$

$$= 4g_4 \cdot (a-x)(16x^2 - 16x + 3)$$

$$= 64g_4 \cdot x(1-x)\left(x^2 - x + \frac{3}{16}\right)$$

$$= 64g_4 \cdot x(1-x)\left(x-\frac{1}{4}\right)\left(x-\frac{3}{4}\right)$$

The method is concerned only with the particular value of x for which, $$G_4 = 64x(1-x)\left(x-\frac{1}{4}\right)\left(x-\frac{3}{4}\right)$$

Hence, by substitution, the relevant particular value of $y$ is $g_4 \cdot G_4$.

To consolidate the $g_4 G_4$ interpolation, the binary polynomial coefficients are derived from the five function values of $y$ and $x$ values of 0, ¼, ½, ¾, and 1 as hereinbefore described and are then modified using the specific value of $g_4$ determined for the given value of $x$. From the example in the immediately preceding paragraph the coefficients are modified as follows:

| Fourth order approximation coefficients | Modified coefficients consolidating $g_4 G_4$ |
|---|---|
| a | a |
| b | b |
| K | $K - g_4$ |
| C | C |
| Q | $Q + \frac{3}{4} g_4$ |

If these modified values of the coefficients are now used to perform a second fourth order interpolation, the result of the interpolation will yield a value of $y$ which would have been obtained by using an eighth order interpolation.

A method of determining the polynomial coefficients up to the fourth order is described in U.K. Pat. Specification No. 1,363,073 (U.S. Pat. Specification No. 3,789,203). The additional calculations necessary to extend the method to perform an eighth order interpolation will now be described.

As stated previously, nine function values of $y$ at $x$ values of 0, ⅛, ¼, ⅜, ½, ⅝, ¾, ⅞, and 1 are preferred.

In addition to storing five of these values namely $y(0)$, $y(¼)$, $y(½)$, $y(¾)$ and $y(1)$, for fourth order definition, four numbers $Na$, $Nb$, $Nc$ and $Nq$ must be calculated from the nine function values.

If the method is to be inplemented on a computer, a standard program is included with the main algorithm program. If the method is to be implemented on dedicated hardware and if a computer terminal or programmable calculator is available, a program is written to perform the calculation. Whenever an eighth order definition is required, the program is run to translate the nine function values into the four required higher order definition constants, $Na$, $Nb$, $Nc$ and $Nq$.

Calculation of the four constants $Na$, $Nb$, $Nc$ and $Nq$ is as described in the following Example:

a. The interpolation values ($w$) of the fourth order approximation are determined at the odd eighth values of $x$, that is at $x =$ ⅛, ⅜, ⅝ and ⅞. These values could be determined by a polynomial interpolation method but if fixed word length registers in purpose designed data processing apparatus are used, errors may be introduced. A convenient method of determining the values of $w$ as follows:

$$w_{1/8} = +\frac{35}{128} y_0 + \frac{35}{32} y_{1/4} - \frac{35}{64} y_{1/2} + \frac{7}{32} y_{3/4} - \frac{5}{128} y_1$$

$$w_{3/8} = -\frac{5}{128} y_0 + \frac{15}{32} y_{1/4} + \frac{45}{64} y_{1/2} - \frac{5}{32} y_{3/4} + \frac{3}{128} y_1$$

$$w_{5/8} = +\frac{3}{128} y_0 - \frac{5}{32} y_{1/4} + \frac{45}{64} y_{1/2} + \frac{15}{32} y_{3/4} - \frac{5}{128} y_1$$

$$w_{7/8} = -\frac{5}{128} y_0 + \frac{7}{32} y_{1/4} - \frac{35}{64} y_{1/2} + \frac{35}{32} y_{3/4} + \frac{35}{128} y_1$$

b. The residual needs ($z$) at the odd eighth values of $x$ are then calculated as follows:

$$z_{1/8} = y_{1/8} - w_{1/8}$$
$$z_{3/8} = y_{3/8} - w_{3/8}$$
$$z_{5/8} = y_{5/8} - w_{5/8}$$
$$z_{7/8} = y_{7/8} - w_{7/8}$$

c. The higher order binary polynomial coefficients are calculated from the residual needs:

$$I = 16\left[\frac{1}{7}(z_{7/8} - z_{1/8}) - \frac{7}{45}(z_{3/8} - z_{5/8})\right]$$

$$S = \frac{64}{3}\left[\frac{1}{7}(z_{7/8} + z_{1/8}) + \frac{7}{15}(z_{3/8} + z_{5/8})\right]$$

$$P = \frac{32}{5}\left[-\frac{1}{7}(z_{7/8} - z_{1/8}) + \frac{1}{3}(z_{3/8} - z_{5/8})\right]$$

$$E = -\frac{64}{15}\left[\frac{1}{7}(z_{7/8} + z_{1/8}) + (z_{3/8} + z_{5/8})\right]$$

d. The constants (N) are calculated from the binary polynomial coefficients:

$$N_a = S - I$$
$$N_b = S + I$$

$N_c = P$
$N_a = E$ and the fifth number required for the first interpolation loading is obtained within the interpolation routine as follows:

$$N_K = -S = \frac{-(N_a + N_b)}{2}$$

Thus it will be seen that for a small sacrifice in time, an eighth order interpolation can be obtained by the use of a comparatively simple method or apparatus organised for fourth order interpolation only. In general the method can be directed to interpolating a value of a dependent variable $y$ corresponding to a given value of an independent variable $x$, wherein $y$ is a function of $x$ and is described by a linear polynomial series of the $mn$th order, using an $n$th order interpolation method to obtain up to a $mn$th order approximation in $m$ iterations of the $n$th order method.

For example to obtain up to a sixteenth order interpolation using fourth order interpolation would require four iterations of the fourth order interpolation. Expressed in simple terms seventeen function values of $y$ at equal intervals of $x$ would be the preferred function definition form and the method would involve the following steps:

1. factorising the thirteenth to sixteenth order polynomials to obtain an expression which is the product of a common twelfth order polynomial $G_{12}$ and the sum of the twelfth to the nineth order polynomials each multiplied by its approximate coefficient, 2. determining the coefficients and using them to perform a fourth order interpolation to obtain a specific coefficient $g_{12}$ at a given value of $x$ 3. modifying, as required, the coefficients relative to the nineth to twelfth order polynomials to consolidate the $g_{12} G_{12}$ term 4. using the modified coefficients to perform a second interpolation to obtain a value for $g_8$ and then continuing with the steps of the method as described.

Dynamic range limitations may arise when the method of the invention is implemented in fixed point notation. These limitations arise because the higher order polynomials are largely determined by the lower order polynomials and will be influenced by the polynomials involved, the order of the basic interpolation method or apparatus, and the number of interpolation recursions employed. In most practical applications envisaged it is not believed that the limitations will be prohibitive but they result in a restriction in the amplitude of the higher order contributions to the total approximation.

Figure 6:
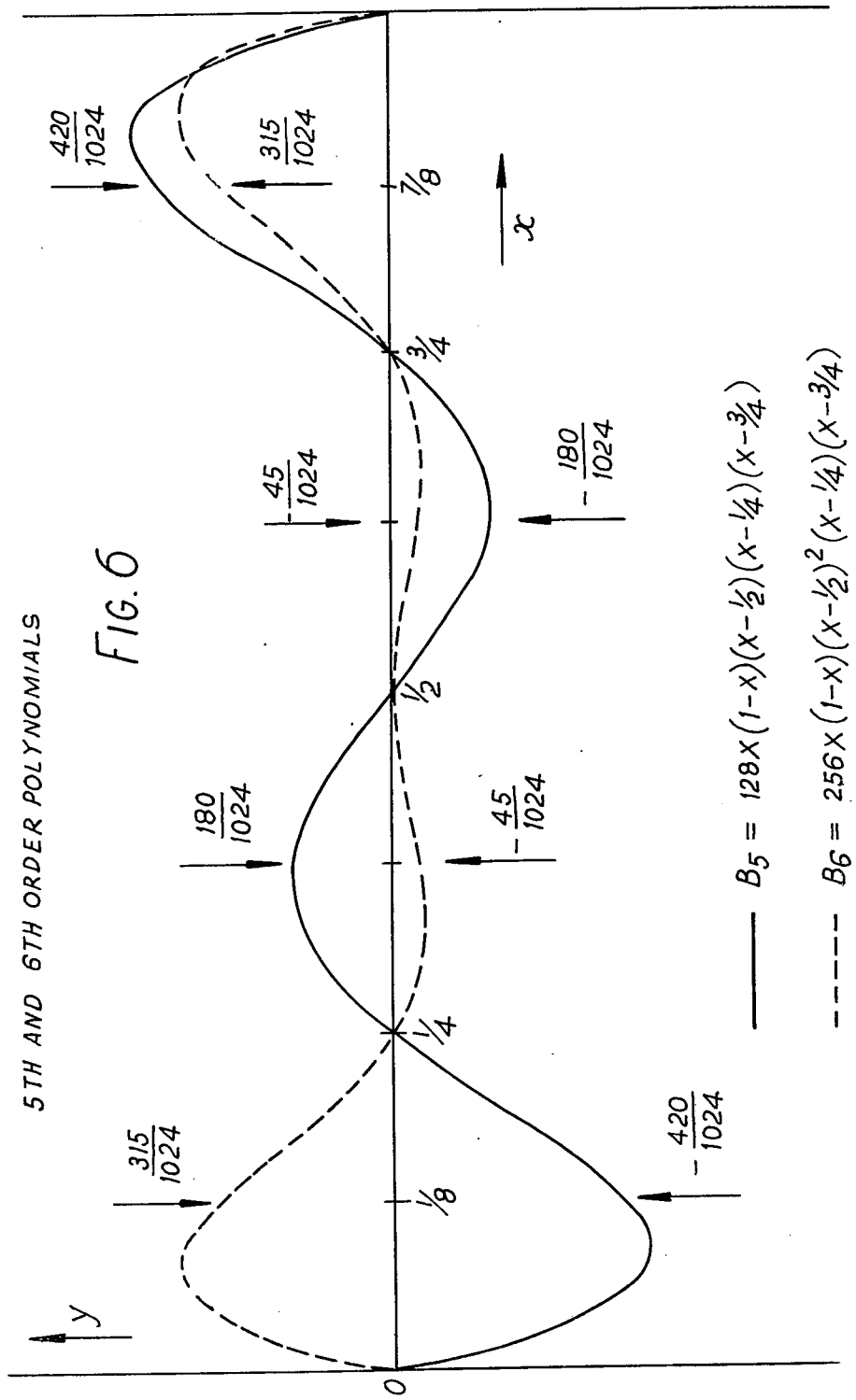
Figure 7:
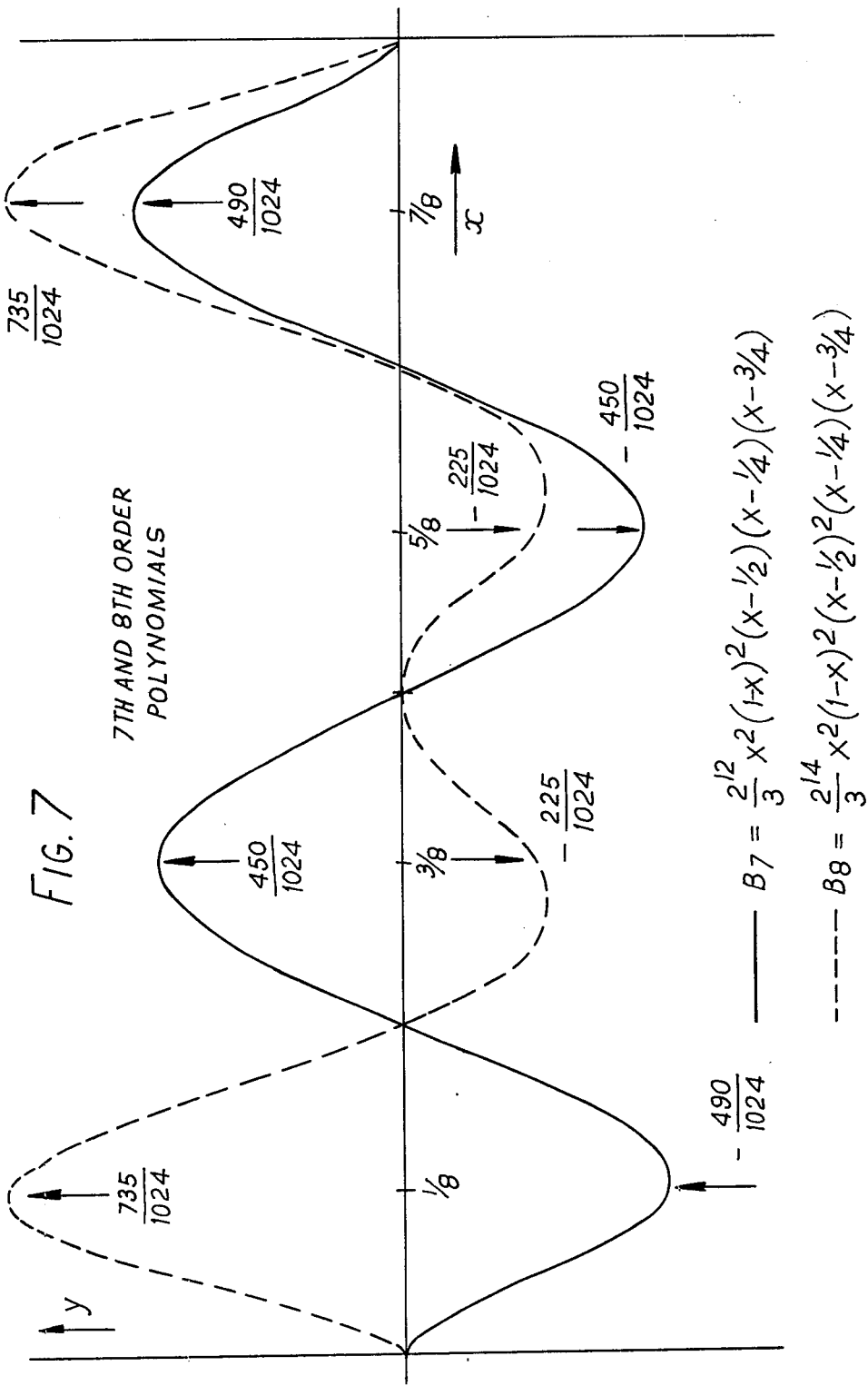

FIGS. 6 and 7 show graphs of the fifth to eighth order polynomials used with apparatus designed to implement a fourth order algorithm in fixed point notation. It will be seen that the scaling factors are such that the peak amplitudes of these $B_5$, $B_6$, $B_7$ and $B_8$ polynomials are smaller than the values which would or could have been used, had free choice of the scaling factors been possible.

This limitation is unlikely to be of any consequence when the invention is implemented using floating point notation.

A further degree of fixed point scaling limitation arises for the fifth and sixth orders due to the necessity for both (S−I) and (S+I) to be within the ±1 range.

The largest potential contribution to limitation derives from polynomial conflict, which results in escalation of the (S−I), (S+I), P and E coefficients. This problem may or may not arise, dependent upon the profile of the residual need above fourth order approximation. The worst case is encountered when the curve fit demands large amplitudes (at the odd one eighth $x$ values) which in combination are ill suited to the operated group of binary polynomials.

While the invention has been described in relation to a particular application it will be realised that its scope is not so limited. For example the method can be implemented by suitably programming a computer, or on data processing apparatus designed for the purpose. An example of one embodiment of such apparatus has been described in relation to FIG. 10 but many other arrangements are, of course, possible depending upon the application. For example, the apparatus can be designed to operate in bit-serial, word-serial; bit-serial, word parallel (FIG. 10); bit-parallel, word-parallel manner or any combination thereof.

I claim:

1. A method of interpolating a value of the dependent variable $y$ corresponding to a given value of an independent variable $x$, wherein $y$ is a function of $x$ and is described by a linear polynomial series of the $2n$th order wherein each term of the series comprises the product of a linear polynomial of $x$ and a coefficient, and the terms of the linear polynomial series containing the $(n+1)$th to the $2n$th polynomials are in the form of an expression which is a product of a common $n$th order polynomial of $x$, and the sum of the zero'th to the $n$th order polynomial each multiplied by its appropriate coefficient, using an $n$th order polynomial interpolation method to obtain up to a $2n$th order interpolation in 2 iterations of the $n$th order interpolation method, the method comprising the steps of:

determining the coefficients for each of the terms of the linear polynomial series;

using the determined appropriate coefficients relevant to the $(n+1)$th to the $2n$th polynomials to perform an $n$th order interpolation to obtain a specific coefficient for the common $n$th order polynomial at a given value of the independent variable $x$;

modifying, as required the coefficients relevant to the $n$th and lower order polynomials of the series to consolidate the term which comprises the common $n$th order polynomial multiplied by its specific coefficient to provide modified coefficients;

and performing a second $n$th order interpolation using the modified coefficients at the given value of the independent variable $x$;

whereby the result of the second interpolation is the value of the dependent variable $y$ for the given value of the independent variable $x$ which would have been obtained by using a higher order interpolation method up to the $2n$th order.

2. A method according to claim 1, in which the zero'th to the $n$th order polynomials of the said series containing the $(n+1)$th to the $2n$th polynomials are the same as the zero'th to the $n$th order polynomials of the series and the said appropriate coefficients are used unmodified to perform the first said $n$th order interpolation.

3. A method according to claim 1, in which at least some of the zero'th to the $n$th order polynomials of the said series containing the $(n+1)$th to the $2n$th polynomials are different from the zero'th to nth order polynomials of the series, but of the same order, and at least some of the said appropriate coefficients are modified before using them to perform the first said nth order interpolation.

4. A method according to claim 1 in which the said common nth order polynomial is the same as the nth order polynomial of the series and the step of modifying the coefficient relevant to the zero'th to nth order polynomials in the series comprises the step of consolidating the coefficient of the nth order polynomial and the specific nth order coefficient obtained in the first said nth order interpolation.

5. A method according to claim 4 in which the series is a binary polynomial series.

6. A method according to claim 5 in which the binary polynomial series is an eighth order binary polynomial series and the value of the dependent variable is interpolated using two iterations of a fourth order interpolation method.

7. A method according to claim 5 in which the said common nth order polynomial is symmetrical about the x domain centre.

8. A method according to claim 5 in which the binary polynomial series is of the form $y = d_0B_0 + d_1B_1 + \ldots d_8B_8$ with $d_n$ and $B_n$ defined in accordance with the following Table:

| Coefficient designation ($d_n$) | Binary Polynomial ($B_n$) |
|---|---|
| $d_0 = \frac{b+a}{2}$ | $B_0 = 1$ |
| $d_1 = \frac{b-a}{2}$ | $B_1 = 2(x-1/2)$ |
| $d_2 = k$ | $B_2 = 4x(1-x)$ |
| $d_3 = C$ | $B_3 = \frac{64}{3} x(1-x)(x-1/2)$ |
| $d_4 = Q$ | $B_4 = \frac{256}{3} x(1-x)(x-1/2)^2$ |
| $d_5 = I$ | $B_5 = 128x(1-x)(x-1/2)(x-1/4)(x-3/4)$ |
| $d_6 = S$ | $B_6 = 256x(1-x)(x-1/2)^2(x-1/4)(x-3/4)$ |

9. A method according to claim 8, comprising the step of factorising the highest-order terms of the series from the fifth to the eighth order to derive an expression of the form $G_4 = g_4G_4$, wherein $G_4$ is the common fourth order polynomial, $H_1$ to $H_4$ are first to fourth order polynomials respectively, I, S, P and E are the coefficients of the fifth to eighth order polynomials respectively, and $g_4 =$ is a numeric term for the said given value of x.

10. A method according to claim 9, in which the said fifth to eighth order coefficients I, S, P and E are used in the first fourth order interpolation to obtain the specific coefficient $g_4$ in such a way that values (S—I) and (S+I) represent the two point values defining the initial segment of the independent variable and the values —S, P and E represent the second, third and fourth correcting terms respectively.

11. A method according to claim 10, wherein the common fourth order polynomial, $G_4$ is equal to the fourth order polynomial, $B_4$ in the series and the said step of modifying the coefficients relevant to the fourth and lower order polynomials in the series comprises summing the coefficient $d_4$ of the fourth order polynomial and the coefficient, $g_4$.

12. A method according to claim 10, wherein the common fourth order polynomial $G_4$ is not equal to the fourth order polynomial $B_4$ in the series, and the step of modifying the coefficients relevant to the fourth and lower order polynomial in the series comprises subtracting the value of the specific coefficient $g_4$ from the second order coefficient K and adding three-quarters of the value of the coefficient $g_4$ to the fourth order coefficient.

13. A method according to claim 1 in which the said common nth order polynomial is different from the nth order polynomial of the series.

14. A method according to claim 1 in which $n = 4$.

15. A method according to claim 1 in which the nth order interpolation method comprises a method of obtaining a value of a dependent variable, y, for a given value of an independent variable, x, wherein y is a function of x and is described by a polynomial series of the form $y = d_0B_0 + d_1B_1 + d_2B_2 + d_3B_3 + \ldots + d_{2n}B_{2n}$ where Bn is a linear polynomial expression of x in the nth order and dn is the relevant coefficient, the interpolation method comprising the steps of;

storing digital quantities representative of two point values defining an initial segment of the independent variable, and predetermined values of at least a second-order and a third-order correcting term, and carrying out the steps of, linearly interpolating between the two stored point values to obtain a digital mid-point value and to create two new segments, one of which is UP with respect to the mid-point value and one of which is DOWN, compensating the digital mid-point value by the addition of a compensating value comprising the second order correcting term to form a compensated digital mid-point value, determining whether the new segment of interest for the next stage of the method is UP or DOWN with respect to the compensated mid-point value, using the determined UP/DOWN information to effect replacement of one of said first and second digital quantities representative of the two stored point values by said compensated digital mid-point signal to create a new segment containing the correct value of the independent variable, modifying the compensating signal by dividing the digital value representative of the second-order correcting term by four, using the said UP/DOWN information to effect addition to or subtraction from the divided value of the second order correcting term of the value representative of the third-order correcting term in dependence upon whether the said new segment is UP or DOWN to form a new correcting term, modifying the digital value representative of the third-order correcting term by dividing it by eight, repeating the steps of linearly interpolating, compensating, determining, replacing and modifying to generate new digital quantities defining successively smaller segments having end points converging upon the correct value of the independent variable.

16. A method according to claim 15, in which the correcting terms comprise a fourth order correcting term and the step of modifying the compensating value further comprises the addition of the fourth-order correction term, and the step of modifying the digital value representative of the third-order correcting term comprises the step of using said UP/DOWN information to effect addition to or subtraction from the third-order term of half the value of the fourth-order term in dependence upon whether the said new segment is UP or DOWN, and the method further comprises the step of modifying the digital value representative of the fourth-order term by dividing it by sixteen.

17. A method according to claim 16, in which the said initial segment of the independent variable extends from $x = 0$ to $x = 1$ and the $x$ domain centre is equal to ½.

18. A method according to claim 15 in which each polynomial expression is arranged to have one of odd and even symmetry about the $x$ domain centre.

19. A method according to claim 15 arranged to obtain the value of the dependent variable $y$ for a given value of the independent variable $x$, comprising the step of storing the said value of the independent variable $x$ in binary form and examining the bits in turn, starting with the most significant bit and the step of determining whether the new segment is UP or DOWN for the $(n+1)$th stage of the method is effected by examining the $n$th bit of the independent variable to determine in accordance with the value of the said $n$th bit whether the new segment is UP or DOWN.

20. Apparatus for obtaining a value of one of a first variable $y$ and a second variable $x$ for a given value of the other variable, wherein $y$ is a function of $x$ and is decribed by a polynomial series of the form $y = d_oB_o + d_1B_1 + d_2B_2 + d_3B_3 + \ldots d_{2n}B_{2n}$, where $B_n$ is a linear polynomial expression of $x$ in the $n$th order and $d_n$ is the relevant coefficient, the apparatus comprising storage means for storing digital quantities representative of two point values defining an initial segment of the independent variable, and predetermined values of correcting terms from the second-order to the $2n$th order and means for performing an $n$th order interpolation comprising means for linearly interpolating between two stored end point values to obtain a digital mid-point value and to create two new segments, one of which is UP with respect to the mid-point value and one which is DOWN, means for compensating the digital mid-point value by adding to it a compensating value comprising a second order correcting term to form a compensated digital mid-point value, means for determining whether the new segment of interest for the next stage of the method is UP or DOWN with respect to the compensated mid-point value, means responsive to the determined UP/DOWN information to effect replacement of one of said first and second digital quantities representative of the two stored point values by said coompensated digital mid-point signal to create a new segment containing the correct value of the independent variable, means for modifying the compensating signal by dividing the digital value representative of the second-order correcting term by four, using the said UP/DOWN information to effect addition to or subtraction from the divided value of the second order correcting term of the value representative of the third-order correcting term in dependence upon whether the said new segment is UP or DOWN to form a new correcting term, and means for modifying the digital value representative of the third-order correcting term by dividing it by eight, and control means for so controlling the apparatus as to iteratively cause it to generate new digital quantities defining successively smaller segments having end points converging upon the desired value of the independent variable.

21. Apparatus according to claim 20, in which the storage means is arranged to store a predetermined value of a fourth-order correcting term and the means for modifying effects modification of the compensating value by the addition to it of the fourth-order correcting term, means for modifying the digital value representative of the third-order correcting term by using said UP/DOWN information to effect addition to or subtraction from the third-order term of half the value of the fourth-order term in dependence upon whether the said new segment is UP or DOWN, and means for modifying the digital value representative of the fourth-order term by dividing it by sixteen.

22. Apparatus according to claim 20 in which the said linear polynomial series is a binary polynomial series.

23. Apparatus according to claim 20 in which each polynomial expression is arranged to have odd or even symmetry about the $x$ domain centre.

24. Apparatus according to claim 23, in which the said initial segment of the independent variable extends from $x = 0$ to $x = 1$ and the $x$ domain centre is equal to ½.

25. Apparatus according to claim 20 comprising means for storing the said value of the independent variable $x$ in binary form and means for examining the bits in sequence, starting with the most significant bit and the said means for determining whether the new segment is UP or DOWN for the $(n+1)$th stage of the method is arranged to examine the $n$th bit of the independent variable to determine in accordance with the value of the said $n$th bit whether the new segment is UP or DOWN.

26. Apparatus according to claim 25, in which the means for storing the said value of the independent variable is a shift register controlled by clock-pulses from said control means and the means for examining the bits of said independent variable is a detector arranged to detect the most significant fractional bit in the shift register at each stage of operation.

27. Apparatus according to claim 26 further comprising means for determining when all of the bits of the independent variable in the shift register are zero at the end of the first interpolation, means for restoring the value of the independent variable in the shift register and means responsive to the means for determining when all of the bits of the independent variable are zero at the end of the second interpolation and arranged to generate an output signal to terminate operation of the apparatus.

28. Apparatus according to claim 20, in which the storage means comprises a plurality of shift registers arranged to receive, in operation, digital values representative of the said two point values and said initial and modified correcting terms, the shift registers being controlled by clock-pulses from said control means.

29. Apparatus according to claim 20, in which the means for linearly interpolating two values includes means for summing the said two values and for providing a digital output signal representative of half of the sum of the said two values.

* * * * *

UNITED STATES PATENT OFFICE
CERTIFICATE OF CORRECTION

Patent No. 4,031,370         Dated June 21, 1977

Inventor(s)  Reginald Catherall

It is certified that error appears in the above-identified patent and that said Letters Patent are hereby corrected as shown below:

Column 4, line 36,   "$y_{(1/4)} = [a + y_{(1/2)}]/$" should be
--$y_{(1/4)} = [a + y_{(1/2)}]/2$--.

Column 6, line 56,   "$y = d_0 B_0 + d_1 + B_1 + d_2 + d_3 B_3 + d_4 B_4$" should be
--$y = d_0 B_0 + d_1 B_1 + d_2 B_2 + d_3 B_3 + d_4 B_4$--.

Column 8, line 54,   "$y - d_0 B_0 + d_1 + d_2 B_2 + d_3 B_3 + d_4 B_4$" should be
--$y = d_0 B_0 + d_1 B_1 + d_2 B_2 + d_3 B_3 + d_4 B_4$--.

Column 9, line 68,   "1st $1/2(b - a) B_1 = 2(x - 1\ 1/2)$" should be
--1st $1/2(b - a) B_1 = 2(x - 1/2)$--.

Column 14, line 18,  "$+ K = y_1 = y_{(x = \ )}$" should be
--$+ K = y_1 = y_{(x = 1/2)}$--.

UNITED STATES PATENT OFFICE
CERTIFICATE OF CORRECTION

Patent No. 4,031,370        Dated June 21, 1977

Inventor(s) Reginald Catherall

It is certified that error appears in the above-identified patent and that said Letters Patent are hereby corrected as shown below:

Column 23, line 31,    "$d_0 = \frac{b+a}{2} \quad B_0 \quad S = 1$" should be $$--d_0 = \frac{b+a}{2} \quad B_0 = 1--;$$

Column 23, line 48,    "$G_4 = g_4 G_4$" should be $$--G_4 [I H_1 + SH_2 + PH_3 + EH_4] = g_4 G_4--;$$

line 52,    "$g_4 =$" should be $$--g_4 = [I H_1 + SH_2 + PH_3 + EH_4]--.$$

Signed and Sealed this

Thirtieth Day of January 1979

[SEAL]

Attest:

RUTH C. MASON
*Attesting Officer*

DONALD W. BANNER
*Commissioner of Patents and Trademarks*